Patented June 30, 1931

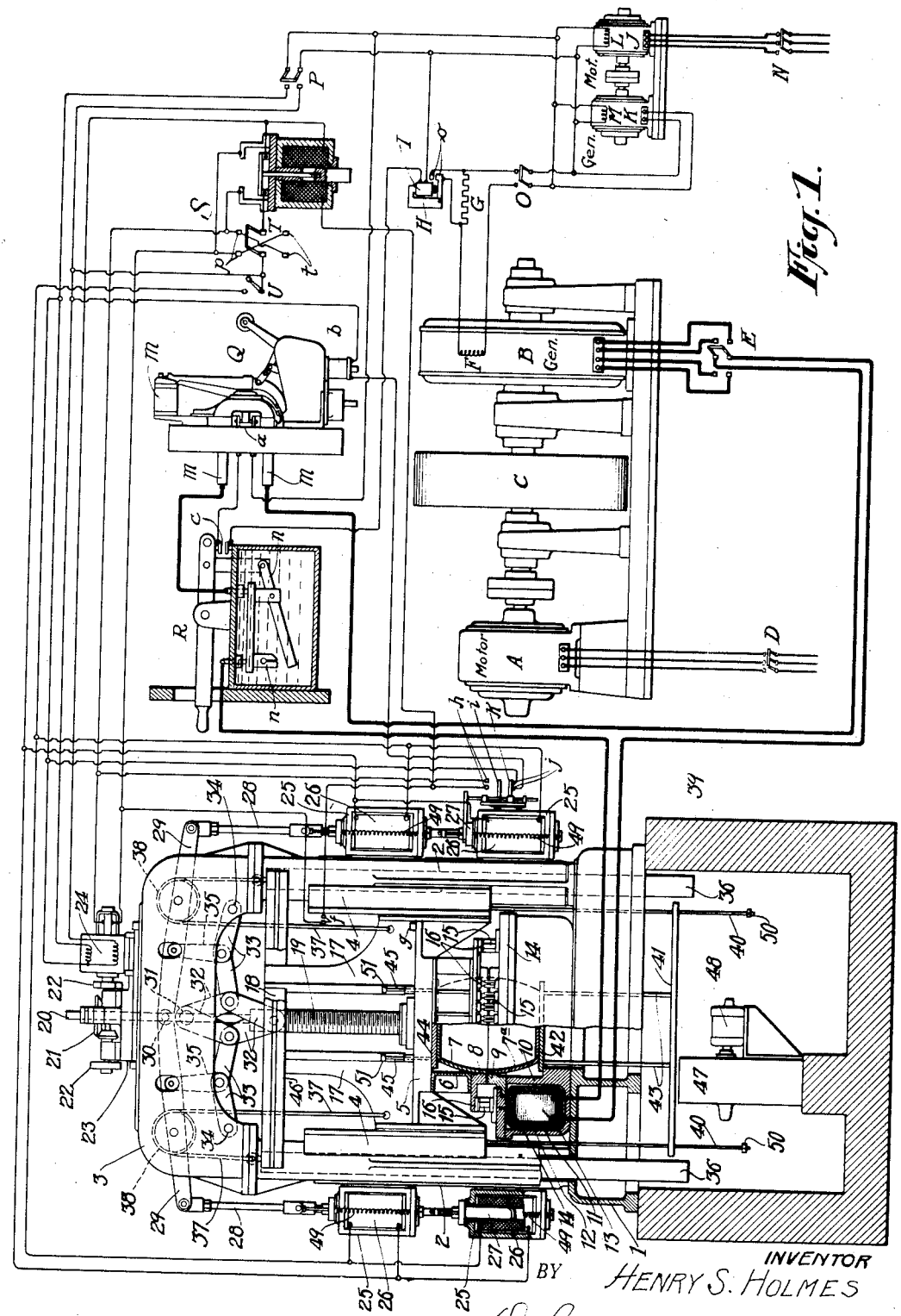

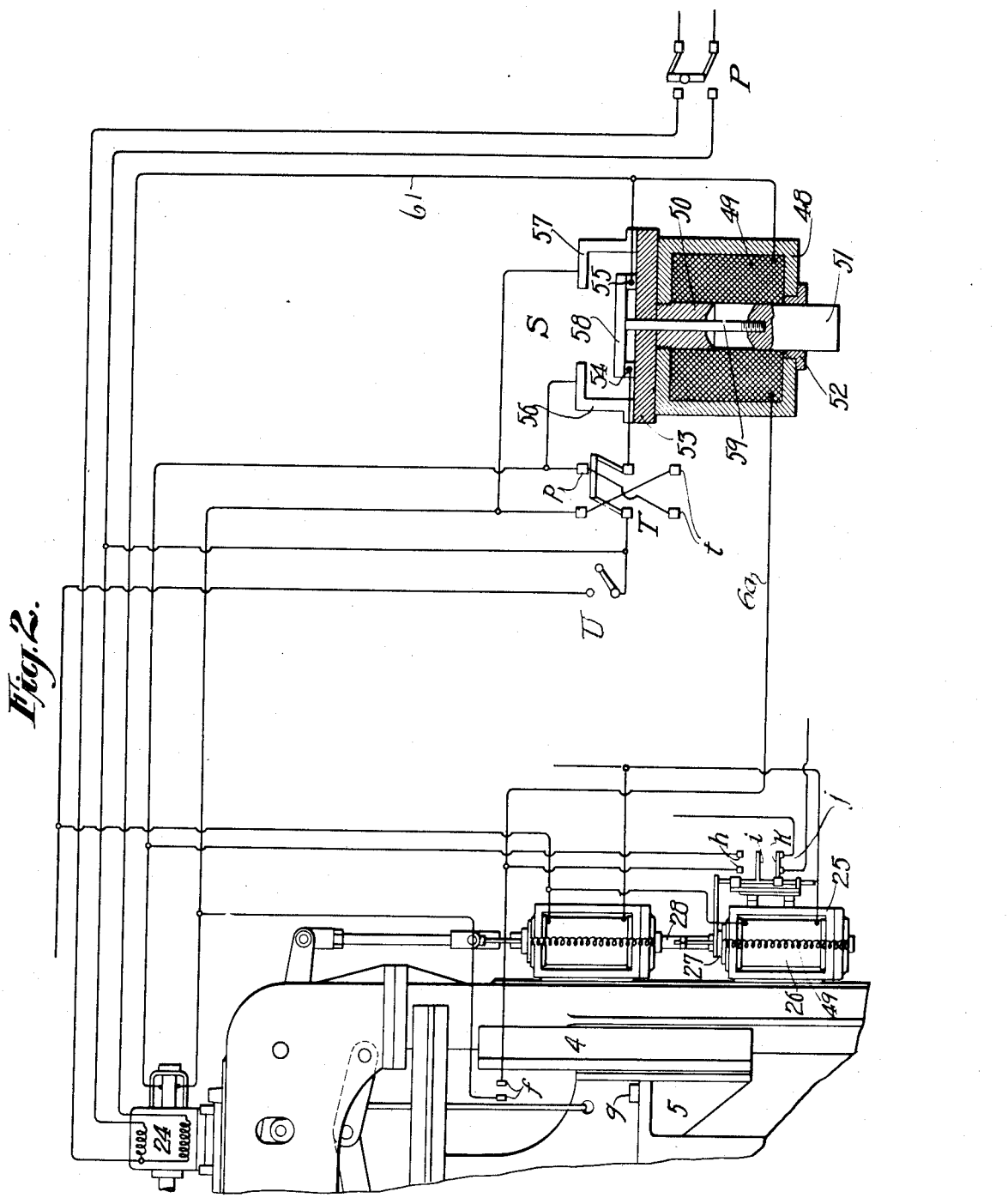

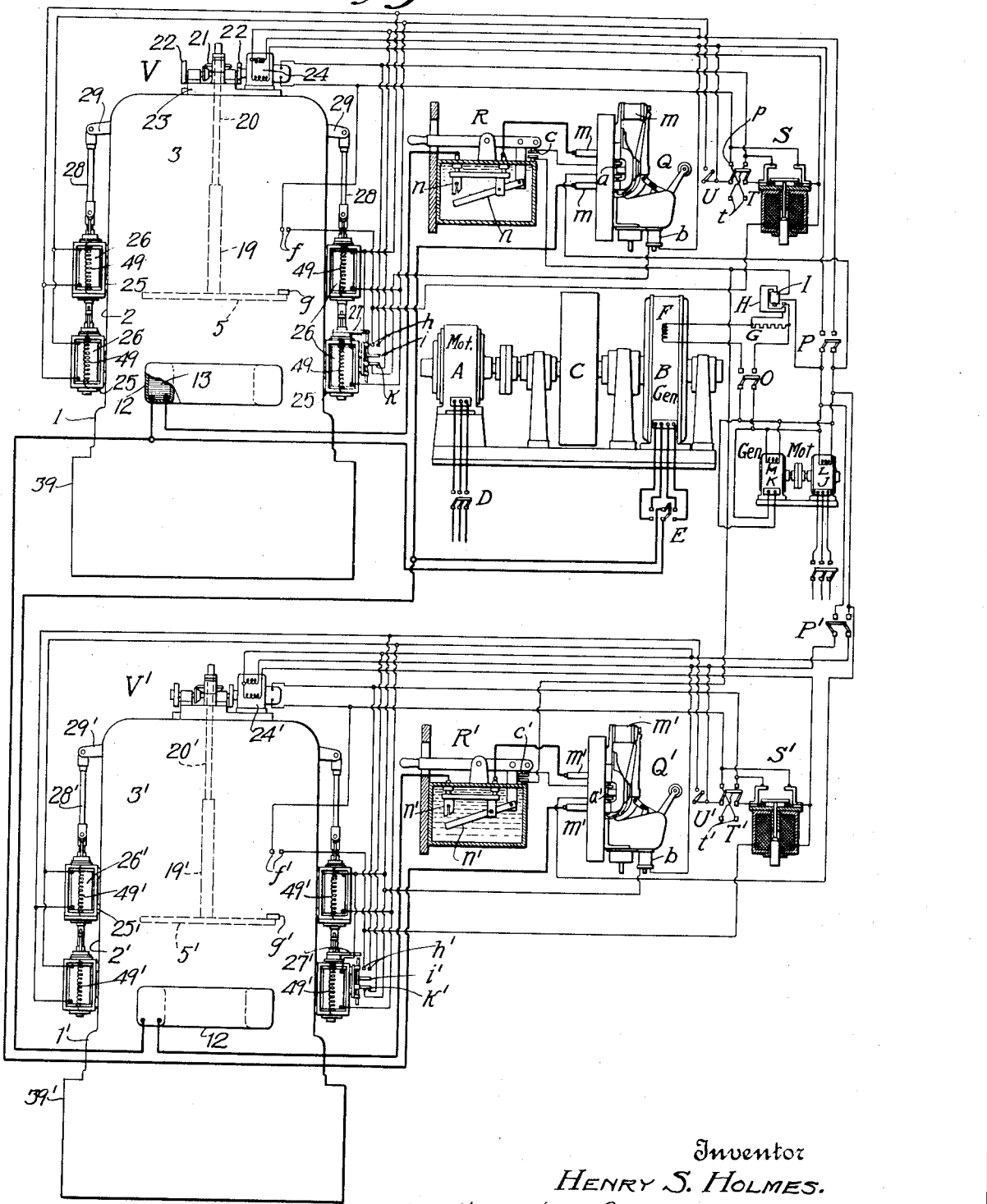

1,812,295

UNITED STATES PATENT OFFICE

HENRY S. HOLMES, OF NEW YORK, N. Y., ASSIGNOR TO THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN ENGINEERING COMPANY, A CORPORATION OF NEW YORK

ELECTRIC WELDING APPARATUS

Application filed February 1, 1924. Serial No. 689,878.

My invention provides a method and apparatus which is designed particularly for comparatively large butt-welding operations, but which is adapted also to a variety of other operations, and by which economy and certain advantages in the operations are achieved.

The accompanying drawings illustrate an embodiment of the invention; Fig. 1 being an elevation of the machine with certain details in section and with the electrical apparatus shown more or less diagrammatically, and Fig. 2 being an enlarged view of a limit switch and connections. Fig. 3 is a diagram illustrating the application of the invention to two machines.

Referring to the embodiment of the invention illustrated, the machine is designed especially for welding together the two halves of a steel barrel by the method described in the Murray Reissue Patent No. 15,466 of October 10, 1922; in which the parts are pressed together at their edges and a current is passed through them of high ampere strength and brief duration.

In such operations with ordinary electric apparatus there is a wide voltage fluctuation which is particularly objectionable where the electric system is of comparatively small capacity.

When welding large objects requiring heavy currents, as in the specific case illustrated, I have found that it takes about one minute to load and unload the welding machine, that is to remove the welded article and insert a new piece for the next operation; while the welding current has to be applied only for a small fraction of this time, say from a fraction of a second to four seconds. This means that the generator, so far as temperature rise is concerned, need only be one-sixth to one-fourth the size of a generator designed to carry the welding current continuously.

My present invention permits the use of a generator which is of insufficient capacity to carry the welding current continuously. A motor is arranged to store energy between welding operations and to deliver it to the generator of the welding current as required. This motor likewise may be designed to consume from the electric system or other power source at any instant only a fraction of the energy required by the welding machine. And I propose to supplement this motor, storage and generator system by certain controlling means which will adapt it to the desired welding operations.

Using such a generator of small capacity, a difficulty arises when it is suddenly subjected to an overload of anything like 400 to 600%. The voltage of the generator will drop to less than one-fourth of its open circuit value. This is due to the small copper cross-section of the generator winding and to the relatively high impedance. To take care of this difficulty, I propose to compensate, more or less, for the drop in voltage, by applying an increased current to the generator field. This increased current is made available during the welding operation. It may, however, be applied continuously to the generator, so that its open circuit voltage will be continuously above normal; or it may be applied only during the weld; the generator field either being without excitation between the welds or having a normal excitation between welds and an increased excitation during the welds. I prefer the last method; that is exciting the field at such a current value that the open circuit voltage of the generator will be normal, and increasing the field current during the time of welding so as to compensate at least in part for any tendency to a drop in voltage.

The first method, using a field current continually maintained above the normal has several advantages. A high potential is available at the electrodes the instant the weld starts. This helps break down any dust, oil, rust or other insulating material which may exist on the edges of the two pieces to be welded. Another advantage is that if the actual time required for the weld is say two seconds then it will be necessary to apply the current for just two seconds. No time will be required to build up voltage.

There are, however, certain disadvantages in operating the generator at such a high open circuit voltage, chiefly a high cost for the machine (both welder and generator) and a more or less dangerous operation for industrial plants.

The second method, by closing and entirely opening the field circuit, has the advantage that it eliminates the oil switch and the air circuit breaker and requires the smallest copper cross-section for both the armature and the field windings. But with this method there are also certain incidental disadvantages, the necessity of opening the field switch slowly, and the requirement of an appreciable time for the building up of the generator voltage after the field has been excited, which characteristics make this method somewhat unsatisfactory for the Murray process requiring a heavy current for a brief time.

The third method, considering the cost and the general conditions which govern the voltage at which a welding machine may be operated, is usually best adapted for use with the Murray process of welding. The generator is excited to produce the highest voltage which can reasonably be used and then as the load is thrown on, the drop in voltage is more or less compensated for by increasing the field current. This is done by increasing the potential across the field terminals, either by cutting out resistance in series with the field and direct current supply, or by increasing the supply voltage.

The drawing shows a machine with the controlling mechanism arranged to utilize this third method. In the example illustrated, the welding machine is rated at 2400 kva. The two-phase generator of the motor-generator set has a continuous rating of 500 kva. per phase, but it is capable of delivering 3000 kva. per phase for four seconds every twenty-four seconds. The fly wheel weighs 54000 pounds and is driven by a 400 horsepower three-phase motor. The exciting current, as well as the current for the pressure solenoids and other control apparatus is supplied by a 50 kilowatt motor generator set. The generator of said set is 300 volt direct current slightly over compounded and is driven by a 75 horsepower synchronous motor.

The welding machine is equipped with a transformer and electrodes adapted for welding a steel barrel 24 inches in diameter and 32 inches high. The position of the electrodes, solenoid plungers, toggles, and so forth, shown on this drawing is that which would exist at the completion of a weld. The construction of the machine is as follows:—

Upon the bed 1 are upright standards 2 united at their upper ends by cross girder 3. On the inner side of said standards are gibs 4 in which slides the crosshead 5 which carries the filler piece 6 which surrounds the upper half 7 of the barrel and supports the upper electrodes 8 which is a good fit on the circumference of the barrel. The lower and co-operating electrode 9 is supported on the center section of the copper casting 10 which forms part of the secondary of the welding transformer. This transformer is designed to allow the lower half 7ª of the barrel to drop into the center portion of the transformer, thus permitting a smaller overall dimension of the welder and allowing a shorter path for the welding current. Extending in all directions from the center section of the copper casting 10 and turning upward are the arms 11 which form a recess in which is placed the primary winding 12 wound around the iron core 13. The copper plate 14 is placed on top of the casting 10, being fastened in good electrical contact to the arms 11 and insulated from the center section, that is, the lower electrode. This completes the welding transformer, which is constructed under Murray Patent No. 1,333,273 of March 9, 1920, with a view of providing an equal distribution of current to the edges of the pieces to be welded. Upon the plate 14 are contacts 15 which, when upper electrode 8 is in lowered welding position, co-operate with contacts 16 and complete the secondary circuit, allowing the welding current to flow through the edges of the half barrels.

Upon the upper side of the sliding crosshead 5 are vertical guides 17, between which moves a nut 18 which receives a vertical screw 19 rotatably stepped on said crosshead. On said screw is a vertical shaft 20 having a keyway its entire length. It passes through the girder 3 and above is keyed to a bevel gear 21 actuated by gearing 22 supported on a casting 23 and driven by an electric motor 24 also supported on the same casting. Secured on the outer sides of standards 2 are frames 25 in which are disposed solenoids 26, each having a plunger armature 27, which armatures at their upper ends are connected by links 28 to the outer ends of levers 29, which levers pass through cross girder 3 and at their inner ends are pivoted thereto by means of the pin 30. Below said pin are pivoted to the cross girder at 31 the pairs of toggles 32 which at their lower ends are pivoted to nut 18. To the knuckle joints of toggles 32 are pivoted toggles 33, the outer ends of said toggles being pivotally fixed at 34. The knuckle joints of toggles 33 are connected by links 35 to the levers 29. Two counterweights 36 are connected to the slide 5 by the cables 37 which run over the sheaves 38. The base 1 is placed on a concrete foundation 39, which surrounds a pit.

The pull bars 40 are connected to the slide 5 and pass through the cross bar 41 which is secured to the lower knock-out plate 42 by the rods 43. The upper knock-out plate 44 is fastened to the rods 45 which strike against the cross bar 46 when the slide 5 is in the raised position. Below the welder is the blower 47 driven by the motor 48. This blower forces air through the welding transformer for cooling.

The circuit carrying the primary welding current is indicated by heavy lines; and the control circuits by light lines.

A is the motor of the fly-wheel motor-generator set; B is the generator and C is the fly-wheel. The switch D controls the current for running the motor, while the double throw switch E permits either phase of the two phase generator to be connected to the welding machine.

The revolving field F, shown diagrammatically, is actually connected to the direct current source through the usual slip rings. A resistance G is in series with the field, said resistance being short circuited by the contactor H, when the solenoid I is energized. The exciter set consists of the synchronous motor J and the direct current generator K. The field of the motor is shown at L; that of the generator at M. The switch N controls the motor input; the switch O the field current for the fly-wheel generator; and the switch P the direct current for the control and pressure apparatus. The usual starting rheostats for the motors, the field rheostat for the generator, the circuit-breakers, indicating instruments, etc., have been omitted from the drawing for the sake of simplicity. Q is the air breaker in the welding circuit upon which is mounted an auxiliary contactor $a$ which is closed when the breaker is closed and open when the breaker is open. This breaker is closed manually and opened by the solenoid $b$.

R is an oil switch in the welding circuit upon which is mounted the auxiliary switch $c$ which is closed when the oil switch is closed and open when the oil switch is open. The oil switch is both closed and opened manually.

The circuit breaker as shown is closed by hand, and the oil switch is both closed and opened by hand. Of course, if it were desired to place these switches at some distance from the welding machine, they could be adapted for operation by any of the well known means of remote control, such as solenoid, motor or air.

A limit switch is designated as a whole by the letter S. There are various types of limit switch, manual or automatic, which may be used. I have illustrated on an enlarged scale in Fig. 2 an arrangement of such a switch and connections which is particularly useful in machines of this type, and which is automatic in character.

An iron frame 48 carries a solenoid 49 with a stationary core 50 and a movable plunger 51 sliding in a brass bushing 52. The iron frame is secured to a slab 53 of slate or other suitable insulating material, on the top of which are mounted copper contacts 54, 55, 56 and 57. Resting on the contacts 54 and 55 is the copper cross-bar or disc 58 which is connected to the movable plunger 51 by the brass rod 59.

T is the motor control switch and U the pressure control switch. The two contacts $f$—$f$, secured to one of the gibs 4 on the welding machine, are adjustable up and down, and are short circuited by the strap $g$ when the slide 5 is in the upper position. The two contacts $h$—$h$ fastened to the frame of one of the pressure solenoids are short circuited by the strap $i$ when the plunger 27 is in the upper position. The two contacts $j$—$j$ also secured to the solenoid frame, are short circuited by the strap $k$ when the plunger 27 is in the downward position. The straps $i$ and $k$ are vertically adjustable; or the contacts $h$ and $j$ may be adjustable.

The method of operation is as follows:— The switch D is first closed and the fly-wheel motor-generator set brought up to speed in the usual manner. The switch N is closed starting the exciter set. After the generator K of this set has been brought up to the proper voltage, the switch O is closed, thus exciting the generator B of the fly-wheel motor-generator set. It will be noted, however, that a resistance G is inserted in this circuit so that the potential impressed on the field of the fly-wheel generator B is only a fraction of the voltage delivered by the exciter generator K. Both the exciter generator K and fly-wheel generator B are now ready to deliver energy to the welder.

Assuming that the moving electrode 8 is in the upper position, then a barrel-half 7$^a$ is placed in the bottom electrode and the other half 7 placed on top of it. The moving electrode is now lowered into good contact with the upper barrel half. The method is as follows: The direct current supply switch P is closed and may remain closed continuously. The motor control switch T is then swung downwardly to close circuit with the two contacts $t$—$t$.

The result is as follows: The motor 24 is set in operation to rotate the screw 19. The weight of the magnet armatures 27 and the levers connected thereto presses the nut downward and is sufficient to hold the nut 18 stationary, so that the effect of rotating the screw is to move the cross-head 5 downwardly, thus clamping the two barrel halves to be welded between the electrodes 8, 9 and closing the welding circuit through the contacts 15, 16.

When, however, the objects become clamped between the electrodes and the further downward movement of the cross-head 5 is stopped, then the nut 18 will ascend for a short distance on the screw 15 and the effect of this motion multiplied by the toggles and levers, and aided by the springs 49, is to raise mechanically the plunger armatures 27 of the electro-magnets 26, until the circuit is closed between the contacts h—h by the strap i which is secured to and moves with the magnet plunger 27.

By reason of this closure the solenoid 49 on the limit switch S is excited and the plunger 51 is drawn up, lifting the strap 58 from the contacts 54, 55. This breaks the motor circuit. At almost the same instant the strap 58 closes the circuit between the contacts 56 and 57, which short circuits the rotor of the motor 24, causing the rotor to stop instantly. The motor control switch T is then opened, allowing the strap 58 to fall back against the contacts 54, 55.

Conditions are now prepared for energizing the electro-magnets 26 so as to press the welding electrodes 8, 9 together and for the admission of the alternating current to said electrodes. The magnet pressure is effected by closing switch U, which establishes direct current to the coils of all magnets.

To start the weld the alternating current supply switch E is first closed in either direction. The switch Q, the contacts of which are in air, is closed, and then the switch R, the contacts of which are in oil. The advantages of an air and oil switch have been described in Murray Patent No. 1,320,896 of November 4, 1919. Closing said switch allows alternating current to flow through the main contact m of the switch Q and the main contact n of the switch R to the welding transformer, and at the same instant allows direct current to flow through the auxiliary contacts a and c, thus energizing the solenoid I and closing the contacts o, thus short circuiting the resistance G in series with the generator field and increasing the potential impressed on such field sufficiently to compensate for the drop in voltage during the weld.

Current is now flowing through the edges of the barrel halves 7, 7ª and as said edges heat up, the halves are pressed together by the magnet plungers 27 as they are drawn into the solenoids 26. When said plungers reach a pre-determined point on their downward movement the strap k, which is secured to and moves with the plunger 27, closes the contacts j, which energizes the trip coil b on the switch Q, thus opening said switch and interrupting the welding current. Simultaneous with the opening of switch Q is the opening of the contact a, thus de-energizing the coil I and allowing the contacts o to fall open. The above method of interrupting the welding current is described in Holmes Patent No. 1,220,848 of March 27, 1917.

The weld being now accomplished, and the pressure switch U opened, the motor control switch T is swung upwardly to close the circuit with the two contacts p—p. This will result in the raising by the motor 24 of the cross-head 5 until the strap g connects the contacts f—f. Thereupon the solenoid 49 will be energized, thus lifting the strap 58 and stopping the motor as before. The motor control switch T is then opened.

As the cross head 5 moves upward, the nuts 50 on the ends of the pull bars 40 will engage with the cross bar 41 thus raising the lower knockout pad 42 and lifting the welded work from the lower electrode 9, provided the welded work has stuck in said electrode. If the welded work sticks in the upper electrode 8 than it will be forced down by the knock-out pad 44 when the rods 45 strike against the cross-bars 46. The nuts 51 prevent the pad 44 from dropping out when the work is removed.

When the motor reversing switch P is in the upper position, and the moving cross-head has been raised to bring the strap g across the contacts f—f, the circuit is completed through the limit switch by the following line; from the right-hand contact f through the wire 60, coil 49 and wire 61 to the lower or series coil in the motor 24, so as to be connected across the direct current supply in series with the series field of the motor. The voltage drop across this series field is small, so that most of the voltage will pass across the solenoid. The solenoid is connected in parallel with the armature of the motor. This is done in order to make the connection across the contacts f—f inoperative when the motor reversing switch is in the downward position. In the latter case the contacts h—h become operative.

A compound motor 24 is used for two reasons. First, the shunt field serves to produce a proper braking action when the armature is short circuited; second, the series field serves to obtain a good starting torque. This style of motor control using dynamic braking is well known, but I believe its use on welding machines is new.

After the welded work has been removed, the oil switch R is opened and a new pair of objects to be welded are inserted in place between the electrodes and the cycle of operations repeated.

Particular attention is called to the contacts a and c and to the effect of closing said contacts, also to the switch H which in turn closes the contacts o, thus short circuiting the resistance G and thereby allowing the full potential of the exciter generator K to be impressed on the field F. This holds the voltage of the generator B to the desired value, and permits the use of a generator of smaller capacity than would otherwise be possible.

The motors A and J and the generators B and K may be of any type known to the profession as adapted to this particular work. A two-phase generator has been illustrated but a single phase or a three-phase or other suitable type of alternating current generator can be used, the switch E being changed accordingly as will be understood by those skilled in the art.

Instead of the particular controlling apparatus shown, apparatus of various other usual or suitable designs may be substituted. For example, the duration of the welding current may be controlled in the manner described in Woodrow Patent No. 1,230,357 of June 19, 1917, or in that described in the Heany Patent No. 1,050,827 of January 21, 1913, or Heany Patent No. 1,078,675 of November 18, 1913, or by other automatic means.

It is not necessary to use direct current for the pressure magnets or for any of the controlling apparatus. Alternating current may be used instead. Direct current, however, must be used in the field of the generator.

During the welding operation the voltage may fall off, may remain practically constant or may increase. The curve which it follows will depend on a variety of factors, such as the difference in field current between no load and full load and the size of the generator load. In practice the voltage may vary up or down and the current and the power factor may also vary, but the ultimate amount of energy delivered by the generator to the welding machine is greater when the field current is increased than if it remained constant at its original strength.

Not only does the invention permit the use of a small generator, as explained above; but it permits also the use of a motor for driving the fly-wheel or other storage device, the characteristics of which motor are such that it can consume from the power source or main electric system at any instant only a fraction of the energy demanded by the welding machine.

The motor generator set may be used for generating the welding current for a plurality of machines, being connected to the different machines in succession. For instance, suppose there are two welding machines to be operated from the motor generator set. Each machine will weld once every minute. The generator, then, must supply 2400 kva. for four seconds every 30 seconds. In other words, the generator supplies 2400×4 kva. seconds of 9600 kva. seconds. The motor has 26 seconds to bring the fly-wheel back to speed and to store up energy for the next weld. This means, neglecting losses, that the motor will take from the electric system an average of 9600 kva. seconds divided by 26 seconds or 370 kva. for 26 seconds. As a matter of fact the motor will take about twice this kva. at the instant of welding and taper off to less than half that at the end of 26 seconds. By using a motor of the proper type and with the proper characteristics it is possible to limit the inrush to say 700 kva. or to even a smaller value if advisable.

The application of a single generating apparatus to a plurality of machines is indicated diagrammatically in Fig. 3. The machines indicated in outline at V and V' are identical with that shown in Fig. 1. A single motor generating set is shown at A, B and C with a single motor generator for the excitation current of the welding generator. The two machines are connected in multiple on the welding circuit controlled by the switch E. The circuit of each machine is closed only when the machine is actuated to bring together the parts to be welded.

The switches for starting and stopping the operation of the machines are duplicated. The main switch P for the first machine is repeated at P' for the second; the air and oil switches Q and R are repeated as shown at Q' and R' and the limit switch S is repeated at the second machine at S'; so that each one of the welding machines can be operated separately from the other.

It has been proposed in a Heany Patent No. 1,061,375 of May 13, 1913, to use a method of storing energy and applying it to a generator in a spot welding machine, but the intervals between welds in that case are very brief and the power used for that purpose is not comparable to that for which the present invention is most particularly designed. The conditions in that case are not such as to permit a substantial reduction in the size of the generator compared with one of standard design nor to permit the use of a motor consuming at any instant only a fraction of the energy demanded by the welding machine; nor does the patent suggest the controlling or the regulating of the motor generator in any of the ways here described.

The exciter set shown at LM works independent of any slip in the speed of the main motor generator. Commonly used devices for compensating for the drop in voltage require in practice at least 15 to 20 seconds to function. They are comparatively useless on welding operations which are to be accomplished in very brief time intervals. By an exciting arrangement which is independent of any speed variation in the fly-wheel motor generator set, I secure the application of the exciting current to the field of the generator at the instant of the weld.

It will be understood by one skilled in the art that the exciter set shown in Fig. 1 would not be necessary if another suitable source of direct current were available. If direct current were available from the mains of the power company, the additional cost of a motor generator set for converting alternating current into direct current could be avoided. Such a motor generator set, when used for supplying the field excitation of an alternating current generator is commonly called an exciter. Fig. 1 shows the connections of an actual installation in a location where direct current was not available from the power lines, and therefore a motor generator or exciter was necessary.

The present invention relates to butt welding, as distinctive from spot welding and percussive welding, in which a large quantity of energy is used in each welding operation and in which there is necessarily a considerable interval of time between welds, in which the fly-wheel can accumulate so much energy as to make it feasible to use a materially smaller generator than the normal or standard heretofore used.

It is common to use for short-period duty generators of insufficient capacity to carry such duty continuously. In referring to normal capacity herein, I refer to capacity sufficient under the established rules for performing the welding operations herein described intermittently.

By my present invention I have made it possible to use for these welding operations not only a generator of such a normal capacity (which would be lower than the capacity required for doing the same work continuously) but a generator of capacity substantially below what has heretofore been regarded as normal for intermittent work.

Though I have described with great particularity of detail a certain embodiment of my invention, yet it is not to be understood therefrom that the invention is restricted to the embodiment disclosed. Various modifications thereof may be made by those skilled in the art without departing from the invention as defined in the following claims.

What I claim is:

1. An electric welding apparatus for the complete welding of an article in one welding operation, said apparatus comprising a butt welding machine adapted to take heavy currents from the secondary winding of a transformer for a much shorter period of time than that required to remove a welded article and to insert new pieces in combination with an alternating current generator of a capacity which is less than the normal capacity for carrying the primary current, means for storing energy between welding operations to be delivered to the generator during the weld and means acting instantaneously for applying an increase exciting current to the field of the generator at the start of the weld.

2. An electric welding apparatus for the complete welding of an article in one welding operation, said apparatus comprising a butt welding machine having electrodes adapted to engage and press the parts to be welded together continuously throughout such a welding operation and to pass through the joint a heavy current from the secondary winding of a transformer for a short time, in combination with an alternating current motor-generator of a capacity which is less than the normal capacity for carrying the primary current required by the welding machine, a fly-wheel actuated by the motor to store energy between welding operations and to deliver it to the generator during such operations and means acting instantaneously for applying an increased exciting current to the field of the generator not later than the start of the weld.

3. An electric resistance welding machine including in combination a shaft, a dynamic braking motor for rotating the same and advancing it to clamp the work and close the welding circuit, an operating and a braking circuit for said motor, a limit switch and switch-actuating means operated by the further rotation of the shaft to open the operating circuit of the motor and to close the braking circuit thereof to stop its rotation promptly.

4. An electric resistance welding machine including in combination a nut which is normally stationary, a shaft threaded through it, a dynamic braking motor for rotating said shaft and advancing it through the nut to clamp the work and close the welding circuit, the nut being adapted to yield as the rotation of the shaft is continued, an operating and a braking circuit for said motor, a limit switch and switch-actuating means operated by the backward movement of the nut to open the operating circuit of the motor and to close the braking circuit thereof so as to stop its rotation promptly.

5. An electric resistance welding machine including in combination a transformer carrying one of the electrodes, a reciprocating part carrying the opposite electrode, a plate on which the work piece rests in engagement with the first electrode, rods extending from said reciprocating part and having shoulders and a cross bar adapted to be engaged by said shoulders and moved with said rods near the end of the retractile movement of said reciprocating part and means for communicating the movement of said cross bar to said plate to knock out the said work piece.

In witness whereof, I have hereunto signed my name.

HENRY S. HOLMES.